March 25, 1924.

G. W. SEAGO

NUT LOCK

Filed Jan. 15, 1923  2 Sheets-Sheet 1

1,488,069

George W. Seago.
INVENTOR

BY *Victor J. Evans*
ATTORNEY

WITNESS:

March 25, 1924.

G. W. SEAGO

NUT LOCK

Filed Jan. 15, 1923

George W. Seago.
INVENTOR

BY *Victor J. Evans.*
ATTORNEY

WITNESS:

Patented Mar. 25, 1924.

1,488,069

UNITED STATES PATENT OFFICE.

GEORGE WASHINGTON SEAGO, OF HEMPHILL, TEXAS.

NUT LOCK.

Application filed January 15, 1923. Serial No. 612,715.

*To all whom it may concern:*

Be it known that I, GEORGE W. SEAGO, a citizen of the United States, residing at Hemphill, in the county of Sabine and State of Texas, have invented new and useful Improvements in Nut Locks, of which the following is a specification.

This invention relates to improvements in nut locks.

An object of the present invention is the provision of means whereby, after a nut has been tightly "set up," it may be securely held against accidental reverse movement.

Another object of the invention is the provision of a nut lock which is simple in construction, reliable in use and which may be easily and quickly adjusted to hold a nut in place.

With the above and other objects in view, the invention further includes the following novel features and details of construction, to be hereinafter more fully described, illustrated in the accompanying drawings and pointed out in the appended claims.

In the drawings:—

Figure 1:
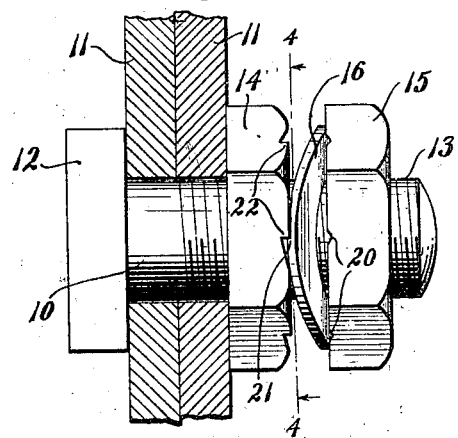
Figure 1 is a side elevation of a nut lock constructed in accordance with the invention.
Figure 2:
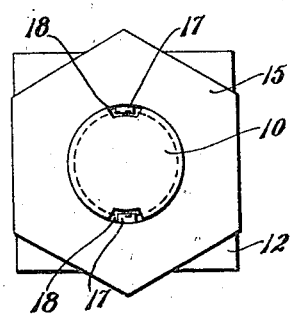
Figure 2 is an end view of the same.
Figure 3:
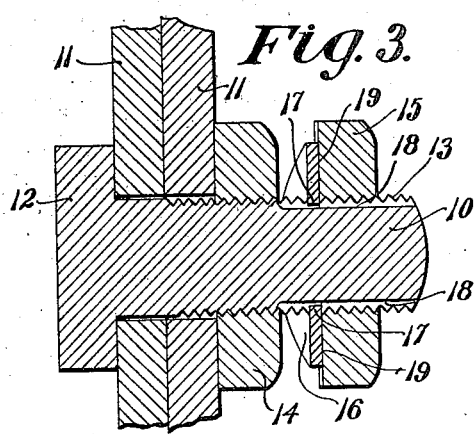
Figure 3 is a longitudinal sectional view.
Figure 4:
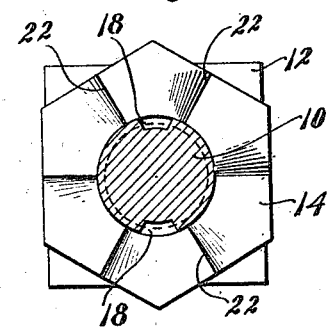
Figure 4 is a section on the line 4—4 of Figure 1.
Figure 5:
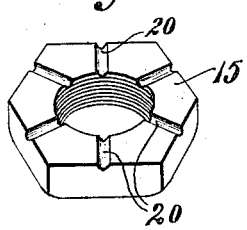
Figure 5 is a detail perspective view of the locking nut.
Figure 6:
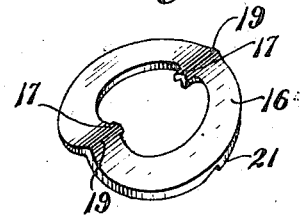
Figure 6 is a similar view of the washer.

Referring in detail to the drawings, wherein like characters of reference denote corresponding parts, the reference character 10 indicates a bolt which is shown as extending through a pair of contacting members 11, which may be of any character, the said members serving to illustrate the use of the invention. The bolt 10 is shown as being provided at one end with a head 12 and is threaded for a portion of its length as indicated at 13.

Mounted upon the bolt 10 is a nut 14, which will be hereinafter referred to as a binding nut and a nut 15, which will be hereinafter referred to as a locking nut. Located between the nuts 14 and 15 is a washer 16, which is provided with inwardly extending oppositely located lugs 17, which are adapted to enter grooves 18, located upon diametrically opposite sides of the bolt and extending longitudinally thereof. This permits free movement of the washer 16 in a direction longitudinally of the bolt but prevents relative rotary movement. The washer 16 is bent or otherwise shaped so as to provide a substantially V-shaped formation, defining diametrically arranged projections or teeth 19 upon one face of the washer and as the latter is formed of spring metal, pressure applied to this face will cause the washer to yield. The locking nut 15 is provided with a series of radially extending notches 20, which are adapted to be engaged by the teeth 19 so as to yieldingly hold the nut 15 and washer 16 against relative independent movement.

Formed upon the opposite face of the washer 16 are radially arranged teeth 21, which are adapted to engage teeth 22 disposed radially of the adjacent face of the binding nut 14, the teeth 21 and 22 providing a ratchet engagement between the washer and nut 14, whereby relative rotary movement of the said nut 14 and washer will be permitted in one direction only.

After the binding nut 14 has been properly "set up" and the washer 16 positioned upon the bolt 10, the locking nut is set up until the teeth 21 and 22 are engaged and the teeth 19 and the notches 20 sufficiently engaged to prevent any accidental rotation. The nut 15 will thus be securely held against movement by the resilient action of the washer and the latter will in turn resist any tendency of the nut 14 to move so that the latter will be securely held in place.

Figure 7:
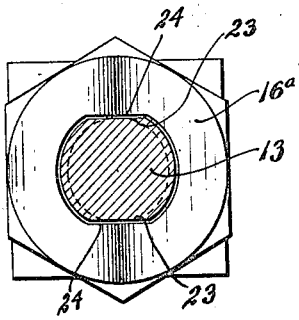
Figure 7 is an end view showing a modified form of the invention with the locking nut removed.
Figure 8:
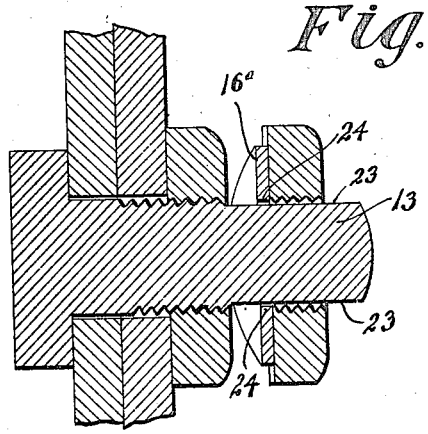
Figure 8 is a longitudinal sectional view of the same with the locking nut in place.
Figure 9:
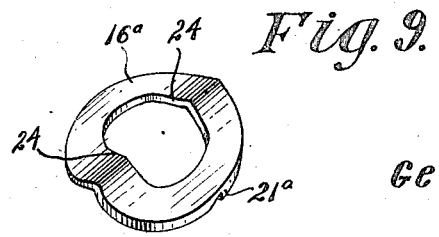
Figure 9 is a detail perspective view of the washer shown in Figure 8.

In Figures 7, 8 and 9 there is illustrated a modified form of the invention. In this form the bolt 13 is flattened upon diametrically opposite sides for a portion of its length as shown at 23, while the washer 16ª has its opening provided with oppositely arranged straight portions 24 for engagement with the flattened portions 23 of the bolt so as to prevent relative rotary movement between the washer and bolt. The locking and binding nuts are constructed the same as in the previously described form of the invention, but the teeth 21ª of the washer extend beyond the plane of the face of said washer so as to provide projecting teeth which engage the teeth 22 of the binding nut 14.

The invention is susceptible of various changes in its form, proportions and minor details of construction and the right is herein reserved to make such changes as properly fall within the scope of the appended claims.

Having described the invention what is claimed is:—

1. A lock nut comprising in combination with a bolt, a binding nut, a locking nut, a substantially V-shaped washer located between said nuts, engaging means between the washer and bolt, whereby the former is permitted movement longitudinally of the bolt, but held against rotary movement and means located upon opposite faces of the substantially V-shaped washer for engagement with the notches provided in the adjacent faces of the nuts.

2. A nut lock comprising in combination with a bolt, a binding nut, a locking nut, a diametrically bent spring washer defining V-shaped projections upon one face thereof for engagement with notches provided in the adjacent face of one of the nuts and means located upon the opposite face of the washer and engaging notches provided in the adjacent face of the other nut, whereby reverse accidental movement of the nuts will be prevented.

In testimony whereof I affix my signature.

GEORGE WASHINGTON SEAGO.